United States Patent

[11] 3,579,982

| [72] | Inventor | Rene Strub |
| | | Winterthur, Switzerland |
| [21] | Appl. No. | 748,555 |
| [22] | Filed | July 29, 1968 |
| [45] | Patented | May 25, 1971 |
| [73] | Assignee | Sulzer Brothers Limited |
| | | Winterthur, Switzerland |
| [32] | Priority | July 27, 1967 |
| [33] | | Switzerland |
| [31] | | 10681/67 |

[54] GAS TURBINE POWER PLANT INCLUDING A NUCLEAR REACTOR AS HEAT SOURCE
1 Claim, 1 Drawing Fig.

[52] U.S. Cl. .................................................. 60/36, 60/59
[51] Int. Cl. .................................................. F01k 25/00, F01k 3/18
[50] Field of Search .......................................... 60/36, 59 (T)

[56] References Cited
UNITED STATES PATENTS

| 2,203,731 | 6/1940 | Keller | 60/59T |
| 2,318,905 | 5/1943 | Traupel | 60/39.25X |
| 3,444,038 | 5/1969 | Schabert | 60/59TX |

Primary Examiner—Martin P. Schwadron
Assistant Examiner—Robert R. Bunevich
Attorney—Pennie, Edmonds, Morton, Taylor and Adams ABSTRACT: There is disclosed a closed cycle $CO_2$ gas turbine power plant in which part of the $CO_2$ flow downstream of an intermediate level compressor is condensed prior to pumping to higher pressure and in which heat is applied to the $CO_2$ from a nuclear reactor in a heating step between successive expansions, and in which for control of pressure in the reactor a line is provided, with adjustable flow control means therein responsive to reactor inlet pressure, connecting the outlet of the condenser with the inlet to the reactor.

PATENTED MAY 25 1971 3,579,982
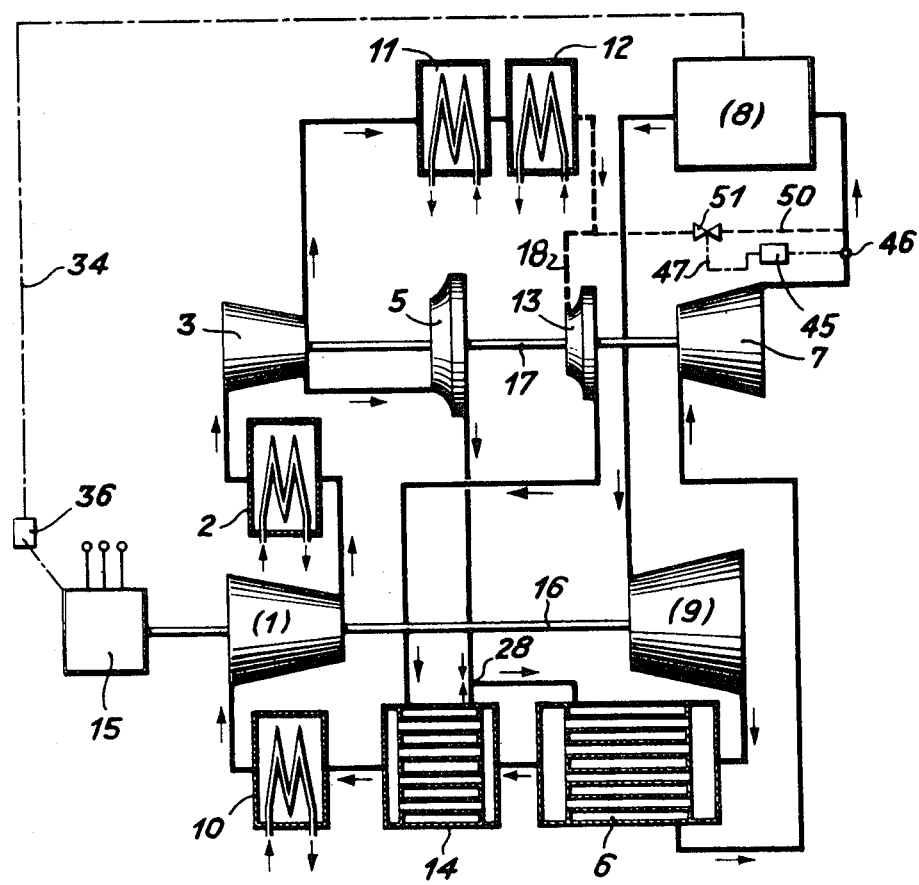
Inventor:
Rene Strub
BY Pennie, Edmonds,
Morton, Taylor and Adams
ATTORNEYS

GAS TURBINE POWER PLANT INCLUDING A NUCLEAR REACTOR AS HEAT SOURCE

The present invention pertains to closed cycle gas turbine power plants employing $CO_2$ as a working substance and employing a nuclear reactor as a heat source. The invention pertains particularly to plants of this type including tow expansion stages on separate shafts with a heating of the working substance between them which extracts heat from the reactor, the useful load being taken off the low pressure shaft and a portion of the working substance being branched off from the main flow path after initial compression, liquefied by extraction of heat therefrom, further compressed, and then returned to the main flow path.

In power plants of the type to which the invention pertains application of heat from the reactor to the $CO_2$ is preferably made after partial expansion thereof down to an intermediate pressure in a high pressure turbine, and a fraction of the gas in branched off from the main flow path, preferably at thigh pressure, and is then cooled and condensed. The condensed, liquified gas is then raised in pressure, preferably by means of a pump, and is heated and returned to the main flow path. In this way, the $CO_2$ cycle is made to approach a Carnot cycle.

It is an object of the invention to provide a power plant of this type in which the reactor is protected against excessive rises in temperature and pressure in the event of partial-load operation of the plant. This object is achieved by holding the pressure of the $CO_2$ substantially constant in its passage through the reactor.

In accordance with the invention, a line is provided between the condensate line and the inlet to the reactor.

By means of the connection provided by the invention, the gas flow path at the input to the reactor is connected to the condenser. Since the pressure in the condenser is in substance specified by the temperature of the cooling water flowing through it and is therefore substantially constant, or at least changes only slowly, the pressure of the gas at the input to the reactor is to a large degree stabilized. Moreover, injection of the relatively cold condensate into the gas stream upstream of the reactor effects, when necessary, rapid colling of that gas stream.

BRIEF DESCRIPTION OF THE DRAWINGS

The invention will now be further described in terms of a nonlimitative exemplary embodiment and with reference to the accompanying drawing in which the single FIGURE of drawing shows schematically a gas turbine plant according to the invention.

In the drawing, "lines" or pipes (i.e. conduits) carrying gaseous $CO_2$ are shown as single lines on the paper. Conduits carrying condensate are shown as dashed lines, while signal conduits are shown as dot-dash lines.

DESCRIPTION OF PREFERRED EMBODIMENT

In the drawing the low pressure compressor 1 is disposed on the shaft 16 of the low pressure turbine 9, this shaft also carrying the useful load electric generator 15. The compressor 15 aspirates cold expanded gas and raises it to an intermediate level of pressure. The gas then passes through an intercooler 2 to an intermediate pressure compressor 3 driven by the high pressure turbine 7 via the shaft 17. Shaft 17 further carries a high pressure compressor 5 and a condensate pump 13, which pump can however be disposed on the lower pressure shaft 16 instead.

At the outlet from the compressor 3 the stream of $CO_2$ is divided into two approximately equal parts. One of these flows through the precooler 11 and condenser 12 to the pump 13 where it is raised to the highest pressure in the plant. The circuit may be so laid out that the condensate emerging from the condenser 12 is raised in the pump 13 through its critical pressure. From pump 13 the condensate flows to the right, in the drawing, through a heat exchanger or regenerator 14 in which it is heated by waste heat from the full stream of expanded working substance flowing to the left in that unit toward the cooler 10. The partial $CO_2$ stream flowing to the right in unit 14 rejoins at junction point 28 the other half of the working substance.

This other half flows form the outlet of the compressor 3 to a high pressure compressor 5 where it is raised to its final pressure and is then delivered to the junction point 28. From the junction point 28, the combined or complete flow of working substance traverses the regenerator 6, from left to right in the drawing, where it is raised in temperature by spent working substance flowing from right to left. The working substance thus flowing to the right through the unit 6 from the junction point 28 is then delivered to the high pressure turbine 7 for partial expansion.

In the heat exchanger or reactor 8 downstream of the turbine 7, the $CO_2$ is reheated before flowing to the low pressure turbine 9, in which it is expanded to starting pressure and where the useful output of the plant is generated. The working substance then flows from the turbine 9 to the left through the regenerators 6 and 14 and through the cooler 10, in which it surrenders heat, emerging from the cooler 10 in its initial condition to pass again through the flow circuit beginning with the low pressure compressor 1. Heat is abstracted from the working substance in the cooler 10, as in the cooler 11 and condenser 12, by means of a coolant such as water.

In accordance with the invention, there is provided a line or conduit 50 having a flow control device or valve 51 therein. This line couples the condensate line 18, which extends between the condenser 12 and pump 13, with a point in the gas flow cycle between the high pressure turbine 7 and the reactor 8. The flow control device 51 may take the form of a simple on-off valve, or it may be a flow regulating device. In either case it includes an actuator for adjustment of the flow aperture therein in response to signals arriving on signal line 47. It is adjusted in position in response to signals arriving over signal line 47 from a pressure regulator 45 responsive to pressure measured at 46 in the gas flow cycle upstream of the reactor.

Load control of the plant is effected by a demand load signal generating device 36 which is coupled to the electric generator 15 and from which a signal is delivered over the line 34 to the reactor 8, operating for example on mechanism adjusting the position of the control rods in the reactor.

As already indicated, opening of the valve 51 serves to connect the inlet to the reactor with the condenser and to bring the pressure level at the inlet to the reactor into equality with that existing in the outlet from the condenser.

While the invention has been described hereinabove in terms of a presently preferred embodiment thereof, the invention itself is not limited thereto, but rather comprehends all modifications of the departures from that embodiment properly falling within the spirit and scope of the appended claims.

I claim:

1. A closed cycle gas turbine power plant employing $CO_2$ as working substance, said plant comprising high and low pressure turbines on high and low pressure shafts, intermediate and low pressure compressors coupled to said high and low pressure shafts respectively, a high pressure compressor coupled to said high pressure shaft, a condenser, a condensate pump, a heater, means connecting said high pressure turbine, heater, low pressure turbine, low pressure compressor and intermediate pressure compressor together for flow therethrough, means connecting said condenser and pump in series between the outlet of said intermediate compressor and the inlet to said high pressure turbine, means connecting said high pressure compressor between the outlet of said intermediate pressure compressor and the inlet to said high pressure turbine, and controllable flow means interconnecting the outlet of said condenser and the inlet to said heater.